No. 745,811. PATENTED DEC. 1, 1903.
J. FRITSCHE.
MEASURING DEVICE.
APPLICATION FILED MAR. 5, 1903.
NO MODEL. 2 SHEETS—SHEET 1.

Witnesses
Inventor
John Fritsche.
By Diedersheim & Fairbanks
Attorneys

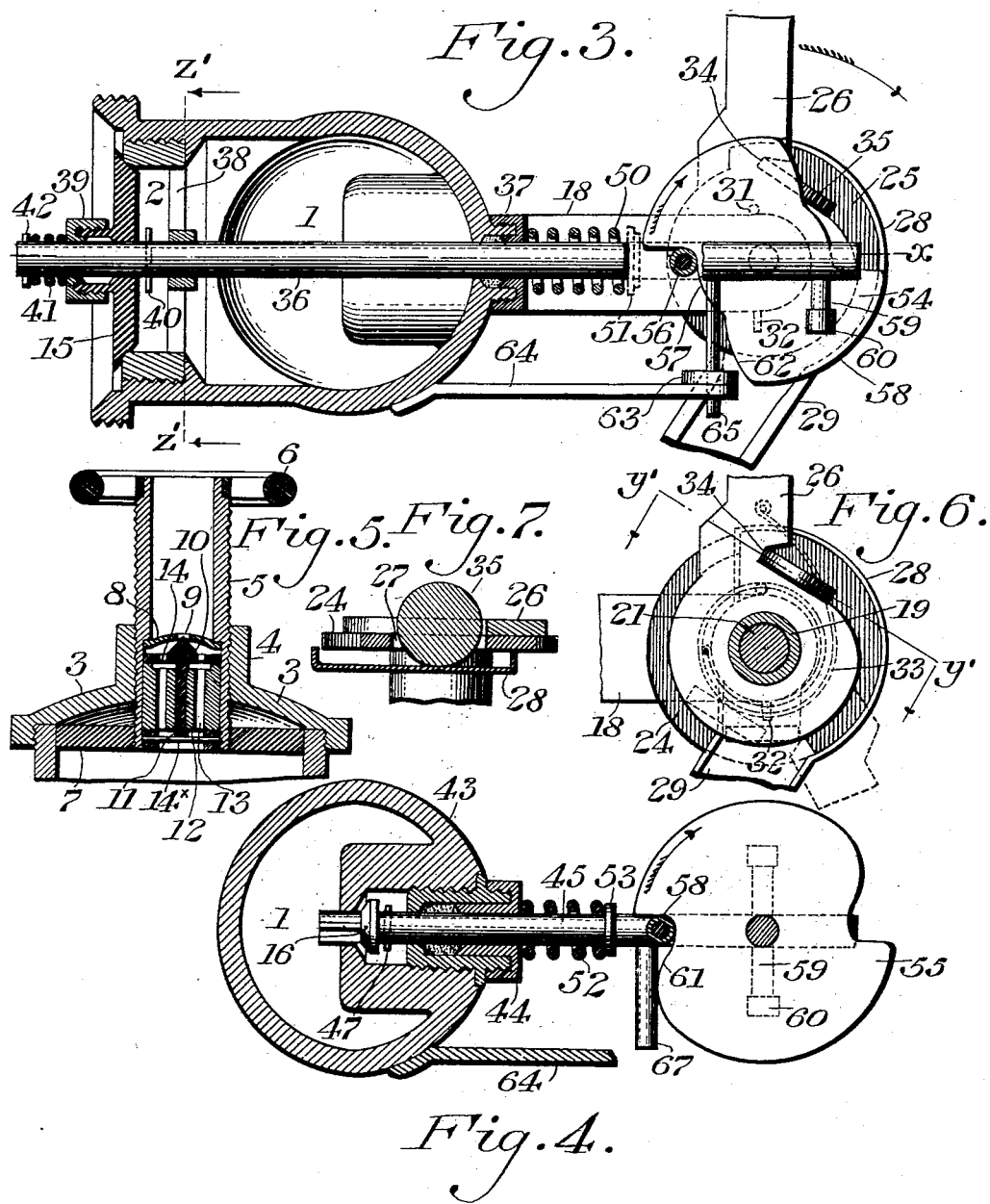

No. 745,811. Patented December 1, 1903.

UNITED STATES PATENT OFFICE.

JOHN FRITSCHE, OF PHILADELPHIA, PENNSYLVANIA, ASSIGNOR OF ONE-HALF TO FRANK HARDART AND JOSEPH V. HORN, OF PHILADELPHIA, PENNSYLVANIA.

MEASURING DEVICE.

SPECIFICATION forming part of Letters Patent No. 745,811, dated December 1, 1903.

Application filed March 5, 1903. Serial No. 146,255. (No model.)

*To all whom it may concern:*

Be it known that I, JOHN FRITSCHE, a citizen of the United States, residing in the city and county of Philadelphia, State of Pennsylvania, have invented a new and useful Improvement in Measuring Devices, of which the following is a specification.

My invention consists of an improvement in measuring devices, as will be hereinafter fully described and claimed.

Figure 1:
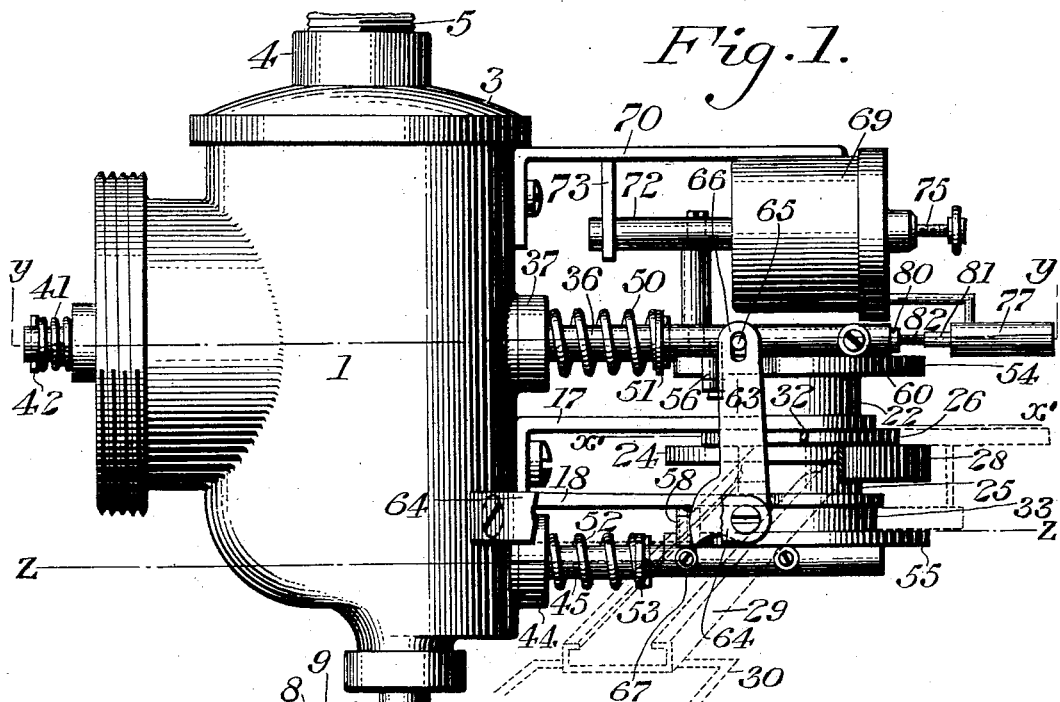
Figure 2:
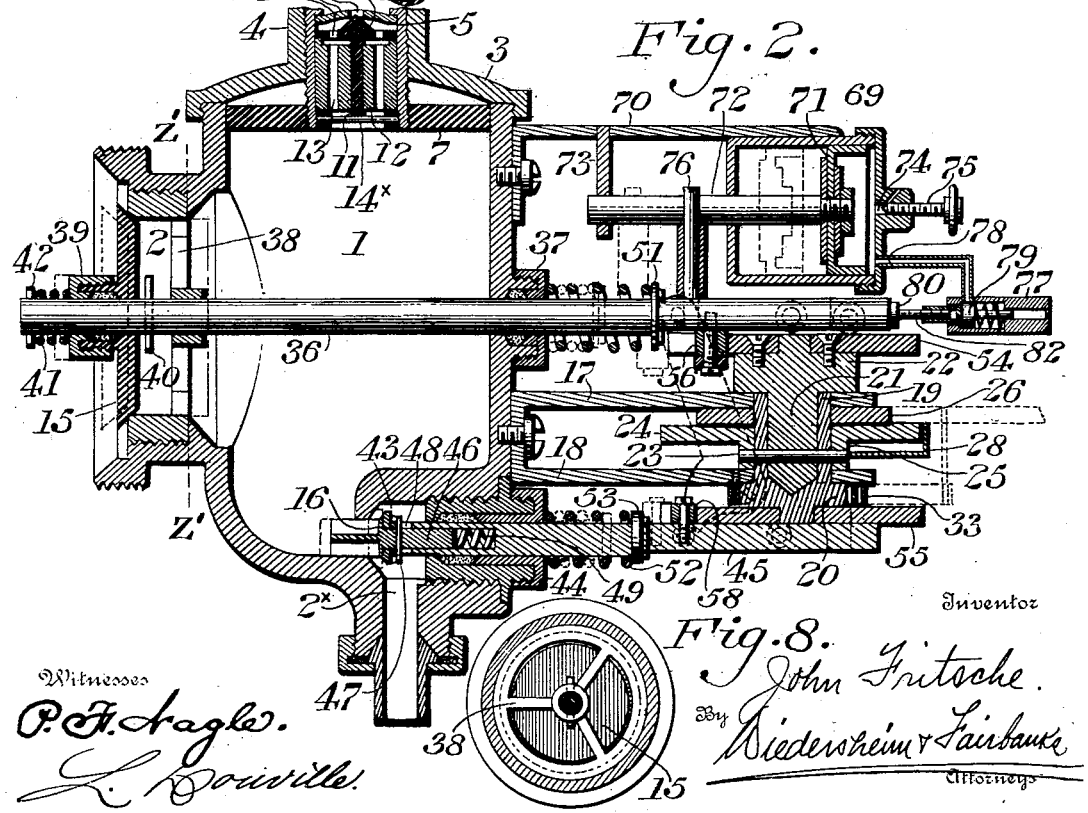

Figure 1 represents a side elevation of a measuring device constructed in accordance with my invention. Fig. 2 represents a vertical section taken on line $x\,x$, Fig. 3. Fig. 3 represents a horizontal section taken on line $y\,y$, Fig. 1. Fig. 4 represents a horizontal section taken on line $z\,z$, Fig. 1. Fig. 5 represents a fragmentary view of the upper portion of the receptacle and accompanying parts, the same being taken on a section coincident with line $x\,x$, Fig. 3. Fig. 6 represents a fragmentary section taken on line $x'\,x'$, Fig. 1. Fig. 7 represents a fragmentary vertical section taken on line $y'\,y'$, Fig. 6. Fig. 8 represents a section taken on the line $z'\,z'$ of Figs. 2 and 3 on a reduced scale.

Similar numerals of reference indicate corresponding parts in the figures.

Referring to the drawings, 1 designates a measuring receptacle or reservoir having an inlet-port 2 at one side thereof and an outlet-port $2^\times$ at its bottom, said ports being valve-controlled, as will be described. The top of the receptacle is closed by a cap 3, having a central interiorly-screw-threaded hub 4, through which passes the exteriorly-screw-threaded tube 5, having a handle or wheel 6 at its outer end for turning the same. To the inner end of the tube 5 is fastened a plunger 7 for varying the capacity of said receptacle, it being noted that as the tube or stem 5 is turned the position of the plunger can be regulated and that by a predetermined graduation the exact position of the plunger 7 may be known. The tube 5 also serves as a vent for said receptacle, the lower end of the tube being counterbored, in the upper end of which bore is a plate 8, having a vent-opening 9, that is controlled by a float-valve 10, as shown in Figs. 2 and 5.

This float 10 is situated within the tube 5, being provided with a stem 11, conveniently squared, which passes through the float 12, having openings 13 registering with the openings 14 in the head of the valve. The float rests on a shoulder formed at the lower end of the enlarged portion of the tube, and a cross-bar or pin $14^\times$ serves to support the lower end of the valve-stem 11. Thus as the liquid fills the receptacle the air can escape through the openings 13, 14, and 9; but when the liquid reaches the float 12 the latter will rise by means of its buoyancy and will lift the valve 10 to close the opening 9. When the liquid is being withdrawn from the receptacle through the port $2^\times$, it is obvious that the float will descend and the valve reopen to allow the ingress of air. The inlet-port 2 is controlled by a valve 15 and the outlet-port $2^\times$ by a valve 16, contacting with suitable seats around said ports, the valve 15 being normally closed and the valve 16 being normally open, and I have arranged a construction whereby these devices are operated by the movement of a single member, the valve 16 being first closed, after which the valve 15 is opened a sufficient length of time to fill the receptacle 1, and then after the receptacle is filled the valve 15 is then closed and the valve 16 opened to allow the contents to pass off through the outlet-port $2^\times$, the operation of said valves being automatic, as will be described.

Projecting preferably from the side of the receptacle opposite the inlet-port are arms 17 and 18, in the outer end of which are openings forming bearings for the tubular shaft 19, the latter having a hub 20 at its lower end contacting with the lower face of the arm 18, while extending downwardly into the upper end of the tubular shaft 19 is another shaft 21, having a hub 22 at its upper end resting upon the upper arm 17, said shafts 19 and 21 being secured together by the pin 23. The shafts 19 and 21 and forming in conjunction with each other the power-shaft of the device and rigid therewith is an abutment formed by the flange or disk 24, situated around the shaft and secured thereto by means of said pin 23, extending through a collar 25 rigid with said flange, the lower end of the collar resting upon the arm 18. Between said disk and the upper arm 17 is a lever or operating-handle 26, swiveled upon said power-shaft.

My invention comprises, broadly, any suitable connection between the operating handle or lever 26 and the power-shaft that serves to move the power-shaft in one direction only, while permitting the lever operating handle to move freely in the other direction—that is, to the extent of one-half of a revolution. The practical embodiment of this part of my invention shown in the drawings consists of a construction whereby the device is made coin-operated—that is to say, the connection between the operating-handle and the power-shaft is due to the interposition of a coin or counter of a predetermined size. This is best shown in Figs. 3, 6, and 7, wherein the disk 24 is shown as provided with two slots or openings 27, situated diametrically opposite, while situated below the disk is a flange-plate or race 28, that is held in position by the coin-chute 29, the lower end of which may be supported by the coin-box 30, said flanged plate or race terminating at the coin-chute, as shown in Fig. 6, it being noted also that the upper end of the coin-chute is located at about a one-half revolution from the normal position of the operating lever or handle 26, as shown in Figs. 3 and 6. The movement of the lever 26 is limited by a stop-pin 31, carried thereby and which contacts with the upper arm 17 when the lever is in its normal position and which contacts with the stop-pin 32 on the other side of the arm 17 and when the lever has been turned a one-half revolution. The lever 26 is returned to its normal position when released after having been turned a one-half revolution by a spring 33, one end of which is secured to the lever 26 and the other to the lower arm 18, the spring being coiled loosely around the hub 20 and acting by contraction. The said lever 26, which is situated just above the disk 24, is provided with a projection or shoulder 34, which is situated at the rear end of the slot or opening 27 in said disk 24 when the lever 26 is in its normal position, it being noted that the other slot or opening 27 is situated over the upper end of the coin-chute 29. As the construction and arrangement of the coin-chute that delivers the coin to the disk 24 does not form part of my invention, I have not shown the same herein, it being understood that any one of the many coin-chutes employed to regulate the insertion of the proper coin can be employed for this purpose.

From the foregoing description it is seen that the operating-lever 26 is capable of oscillating one-half of a revolution only, being returned to its normal position by the spring 33, and that when a coin 35 stands within one of the slots or openings 27 and the operating-wheel 26 is moved by hand one-half of a revolution it will turn the disk 24 and the power-shaft one-half of a revolution also, and that the coin will drop through the slot 27 at the termination of this one-half revolution, owing to the termination of the plate or race 28, as best seen in Fig. 6, and, further, when the handle is released it flies back to its original position, with the shoulder 34 ready to engage another coin that may be placed within the other slot or opening 27.

The power-shaft, composed of the two sections 19 and 21, serves to operate the valves 15 and 16 in the manner before referred to—that is, to first close the valve 16, then open the valve 15 and hold it open for a sufficient length of time to insure the filling of the receptacle 1, and then close it quickly and then to re-open the valve 16 to permit the contents to escape. The valve 15 is operated by a stem 36, yieldingly connected therewith and which passes through the receptacle and through the stuffing-box 37 on the opposite side thereof, being guided by a spider 38, as shown in Fig. 10. The yielding connection between the stem 36 and the valve 15 is obtained by permitting the stem 36 to slide freely through the valve, the joint being protected by a stuffing-box 39, while the play between the stem and valve is limited by means of the pin 40 on the valve-stem at one side of the valve and a spring 41 between the other side of the valve and a pin 42 on the valve-stem. This pin 40 serves to open the valve, while the cushion formed by the spring 41 insures the closing thereof to obviate the necessity for fine adjustment, as will be obvious.

The valve 16 is situated within a valve-chamber 43 at the upper end of the outer port $2^{\times}$, the outer end of said chamber 43 being closed by the stuffing-box 44, through which the stem 45 passes, a cushion being interposed between the stem 45 and the valve 16 for the same purpose as described with relation to the valve 15, which consists in making the inner end of the stem 45 tubular, within which tubular portion the shank 46 on the valve itself slides, the movement between the shank 46 and the stem 45 being limited by the pin 47, carried by the shank which enters the slot 48 in the tubular portion of the stem. A spring 49, situated between the inner end of the stem and the end of the tubular portion, serves as a cushion for the valve. The valve 15 is normally held closed by means of the spring 50, situated between the gland of the stuffing-box 37 and the shoulder or abutment 51 on the stem 36, while the valve 16 is normally held open by the spring 52, situated between the gland of the stuffing-box 34 and an abutment 53 on the stem 45.

Secured to the upper end of the power-shaft is a cam 54, the shape of which is best seen in Fig. 3, while to the lower end of the power-shaft is secured a cam 55, the shape of which is shown in Fig. 4. The said cams 54 and 55 are double cams, so as to operate the valve-stems every half-revolution. Figs. 3 and 4 show these parts in their normal position, in which the projection 56 on the valve-stem 36 is situated at the beginning of the low part 57 of cam 54, while the projection 58 on the valve-stem 45 is situated at the lower part of the cam 55. These valve-stems are prevented from rotating by means of the arms 59, that carry antifriction-rollers 60 at their outer ends, resting against the upper face of the cam 54 and the lower face of the cam 55. The rising part 61 of the cam 55 is situated with respect to the low part 57 and the rising part 62 of the cam 54 that when the power-shaft is operated the first movement thereof causes the rising part 61 of the cam 55 to move the valve-stem and close the valve 16, after which the rising part 62 of the cam 54 operates the valve-stem 36 to open the valve 15, as will be seen by the relative shapes of said cams. The longitudinal movement of the valve-stem 36 in the opening-valve 15 serves to lock the valve 16 closed, and to accomplish this I conveniently employ a lever 63, pivoted upon the arm 64, supported upon the receptacle 1, one end of which lever is engaged by the stem 36, conveniently by means of a pin 65 on the same and a slot 66 in said lever, the other end of the lever being adapted to be thrown into contact with the projection 67 on the stem 45. When the valve 15 is closed, the lever 63 is held so that its lower end is not in the path of the said projection 67 on the stem 45; but after the stem 45 is moved to close the valve 16 then the movement of the stem 36 throws the lever against the projection 67 and locks the same to hold the valve 16 closed until the stem 36 is restored to its normal position to close the valve 15. The purpose of this locking of the valve 16 until the valve 15 is closed is apparent when it is noted that the high part of each of the cams 54 and 55 are coincident, so that the projections 56 and 58 of the valve-stems are released at the same moment by the cams.

The valve 15 of course is held open while the high part 68 of the cam 54 contacts with the projections 56 of the stem 36; but to insure the filling of the receptacle before the closing of the valve 15 I have devised means for varying the period of time in which the valve 16 takes to close after the projection 56 is released from the high part 68 of the cam. I employ these means to compensate for the different capacities of the receptacle 1, which may be obtained by the plunger 11, and also on account, it may be, of differences in fluidity of the different ingredients that may be measured, and such means takes the form generally of devices for retarding the longitudinal movement of the valve-stem 36 in closing the valve 15. The particular embodiment of this retarding device which I have shown consists of a variable-air cushion attained by a cylinder 69, supported upon an arm 70, extending from the receptacle 1, within which is the piston 71, the rod 72 of which passes through a guide 73. The port 74 in the end of the cylinder is controlled by a needle-valve 75 and permits a regular or steady ingress or egress of air, which of course can be regulated to cause the valve 15 to close either fast or slow, but at a regular speed, the piston-rod 72 being rigidly connected with the stem 36 by the pin 76. It is, however, desirable to vary the speed of the stem 36 in closing the valve 15, and for this purpose I use a variable-valve-opening mechanism which comprises an auxiliary valve-chamber 77, communicating with the outlet-port 78 at the end of the cylinder 69 and provided with a normally closed spring-actuated valve 79, the end of the stem 80 of which projects beyond the end of the chamber 77 and in the path of the end of the valve-stem 36. The said valve-stem 80 is adjustable in length, being composed of a section 81, which is tubular and interiorly screw-threaded, and the section 82, exteriorly screw-threaded therein. By adjusting the outer section 82 it is noted that the end of the valve-stem 36 will contact therewith at any portion of its stroke.

It has been seen that with the valve 75 the regular speed of the stem 36 in closing can be regulated; but this variable-speed mechanism can be adjusted according to the capacity of the receptacle and the fluidity of the material to allow the valve to move in closing at one speed at first and until the receptacle is filled, or practically so, and then for the remaining portion of the movement of the valve to move quicker to close it instantly. For instance, the valve 75 may be regulated to cause a very slow movement of the piston 71, while at the same time the adjustable section 82 of the valve-stem may be regulated to contact with the end of the valve-stem 36 when the piston has been completed, for instance, one-half of its movement, it being noted, of course, it having been found that such speed of the valve for one-half of its throw permits sufficient fluid to enter the receptacle 1 to fill the same. The receptacle thus being filled is of course desired then to close the valve 15 instantly, and when the end of the valve-stem 36 contacts with the end of the adjustable section 82 of the valve-stem 80 the valve 79 is opened, and then the outlet from the cylinder 71 being free all unobstruction to the movement of the piston 71 is removed, and the spring 50 closes the valve 15 instantly.

The operation is as follows: The drawings show the parts in their normal position. When the coin is inserted within the slot 27 of the disk 24 or when some other means are employed to connect the lever 26 and said disk 24, the movement of the lever 26 in the direction shown by the arrow in Fig. 3 will cause the disk 24, and with it the power-shaft and cams 54 and 55, to move one-half a revolution. In thus moving, however, the rising part 61 of the cam 55 closes the valve 16, after which the rising part 62 of the cam 54 acts upon the stem 36 to simultaneously open the valve 15 and move the lever 63 to lock the stem 45 and valve 16 closed. Thus as soon as the projections 56 and 58 reach the termination of the high parts of the cams the valve-stem 36 is free to move under the influence of the spring 50, the lever 63 holding the valve 16 closed until the stem 36 regains its normal position. The valve-stem 36 being free to be moved by the spring 50 will close with a regular speed if the outlet from the cylinder is regulated by the valve 75, the valve-stem 82 being adjusted so that it does not strike the end of the stem 36 while the latter is moving to its normal position; but if the stem 82 is adjusted to be struck before the stem 36 completes its throw the said valve 15 first closes with a regular speed until such contact, and then the valve 79 opens and gives a free and unobstructed outlet from the cylinder 69, which permits the piston 71, stem 36, and the valve 15 to move instantly to close the latter. As soon as the stem 36 regains its normal position the end of the lever 63 is moved out of the path of the projection 67 on the stem 45 of the outlet-valve 16, and then the contents of the receptacle can pass out through the port 2×. When the liquid is entering the other port 2, the confined air within the receptacle escapes through the vent 9, the latter being closed as soon as the level of the liquid within the receptacle reaches the float 12 to raise it to the valve 10. As the liquid passes from the receptacle the valve 10 opens the vent 9 to allow the ingress of air. It is noted that as the plunger 7 is moved in varying the capacity of the receptacle 1 the float 12, controlling the valve 10, is correspondingly moved, so that it is always at the upper end of the receptacle to operate the valve when the receptacle is filled.

Having thus described my invention, what I claim as new, and desire to secure by Letters Patent, is—

1. In a measuring device, a receptacle having inlet and outlet ports, valves for said ports, and means for actuating said valves comprising a device for successively closing one of said ports and opening the other of said ports, and means for then closing said other port and opening the first-mentioned port, said device adapted to be actuated from a common source of power, and means independent of the means for actuating said valves for locking said outlet-valve in its closed position during the opening and closing of the inlet-valve.

2. In a measuring device, a receptacle having an inlet-port, means for holding the same normally closed, an outlet-port, means for holding the same normally open and means for successively closing said outlet-port, then opening said inlet-port, then allowing said means to close said inlet-port, and then allowing said means to open said outlet-port, the means controlling said outlet-port being locked in closed position during the opening and closing of the inlet-port, by means independent of the means for opening and closing said ports.

3. In a measuring device, a receptacle having valve-controlled inlet and outlet ports, means operated by a common source of power for alternately closing said outlet-port and opening said inlet-port, and means for closing said inlet-port and means for opening said outlet-port, and means for positively locking said outlet-port closed before the inlet-port is opened and until the inlet-port is closed independent of the means for opening and closing said valves.

4. In a measuring device, a receptacle having an inlet-port, a normally closed spring-actuated valve therefor, an outlet-port, a normally open spring-actuated valve for said outlet-port, and common means for successively closing said outlet-valve and opening said inlet-valve, then allowing said spring to close the outlet-valve and then allowing said spring to open said outlet-valve, and means independent of the means for opening and closing said valves for locking said outlet-valve in its closed position during the opening and closing of the inlet-valve.

5. In a measuring device, a receptacle having an inlet-port, normally closed spring-actuated valve therefor, an outlet-port, a normally open spring-actuated valve therefor, cams for successively closing the outlet-valve, opening the inlet-valve, then allowing said spring to close said inlet-valve, and then allowing said spring to open said outlet-valve, said cams moving together, means for turning the same, and means independent of the means for opening and closing said valves for locking said outlet-valve in its closed position during the opening and closing of said inlet-valve.

6. In a measuring device, a receptacle having an inlet-port, a valve therefor, an outlet-valve and a spring for opening the same, cams actuating said valve, the low parts of said cams normally engaging said valves, the rising part of the cam-actuating outlet-valve being approximately coincident in extent with the low part of the inlet-valve cam, the rising part and the high part of the inlet-valve cam being approximately coincident in length with the high part of the outlet-valve cam, and the high parts of both cams terminating approximately at the same point, and means for turning said cams.

7. In a measuring device, a receptacle having an inlet-port, a normally closed spring-actuated valve therefor, an outlet-port, a normally open spring-actuated valve therefor, cams for alternately closing said outlet-valve and opening said inlet-valve and allowing said spring to close the inlet-valve and said spring to open the outlet-valve and a locking device independent of the means for opening and closing said valves operated by the movement of one valve and adapted to prevent the other valve from opening while the first-mentioned valve is closed.

8. In a measuring device, a receptacle having an inlet-port, a normally closed spring-actuated valve therefor, an outlet-port, a normally open spring-actuated valve therefor, the stems of said valves having projections adapted to be engaged by cams to alternately close the outlet-valve and open the inlet-valve and allow the springs to close the inlet-valve and open the outlet-valve, and an independent connection between said stems, whereby the stem of the outlet-valve is locked in its closed position before the stem of the inlet-valve moves sufficiently to open the latter and to hold said outlet-valve locked until the inlet-valve is closed.

9. In a measuring device, a receptacle having an inlet-port, a normally closed spring-actuated valve therefor, an outlet-port, a normally open spring-actuated valve therefor, the stems of said valves having projections adapted to be engaged by cams to alternately open and close the same, and a lever having one end engaged by the stem of the inlet-valve, the other end of said lever being situated to engage the stem of the outlet-valve.

10. In a measuring device, a receptacle having a normally closed spring-actuated inlet-valve, a normally open spring-actuated outlet-valve, cams for operating the same and an oscillatory lever adapted to engage and turn said cams in one direction only.

11. In a measuring device, a receptacle having a normally closed spring-actuated inlet-port, a normally open spring-actuated outlet-port, means to close said outlet-port, then open said inlet-port, then allow said spring to close said inlet-port, and then allow said spring to open said outlet-port, and means for regulating the speed of closing of the inlet-port.

12. In a measuring device, a receptacle having a normally closed spring-actuated inlet-port, a normally open spring-actuated outlet-port, means to close said outlet-port, then open said inlet-port, then allow said spring to close said inlet-port, and then allow said spring to open said outlet-port, and a retarding device for regulating the speed of closing of the inlet-port.

13. In a measuring device, a receptacle having a normally closed spring-actuated inlet-port, a normally open spring-actuated outlet-port, means for opening the inlet-port and closing the outlet-port, then allowing said spring to close the inlet-port, then allowing the spring to open the outlet-port, a cylinder having a valved outlet, and a piston within said cylinder connected with the inlet-valve to control the closing thereof.

14. In a measuring device, a receptacle having a normally closed spring-actuated inlet-port, a normally open spring-actuated outlet-port, means for opening and closing said ports, and means for regulating the closing of the inlet-valve consisting of devices for imparting to the same a regular or a variable speed.

15. In a measuring device, a receptacle having a normaly closed spring-actuated inlet-port, a normally open spring-actuated outlet-port, means for opening and closing said ports, and means for regulating the closing of the inlet-valve consisting of devices for imparting to the same a regular or a variable speed, the devices for imparting a variable closing speed to said inlet-valve being adapted to be thrown into operation during any portion of the closing stroke thereof.

16. In a measuring device, a receptacle having a normally closed spring-actuated inlet-port, a normally open spring-actuated outlet-port, means for opening and closing said ports, and means for regulating the closing of said inlet-valve consisting of a cylinder having a plurality of outlets of different areas, a piston in said cylinder connected with said inlet-valve, one of said outlets from the cylinder being controlled by a hand-operated valve, and said other outlet being adapted to be opened by the movement of the inlet-valve in closing during any portion of its stroke.

17. In a measuring device, a receptacle having inlet and outlet ports and means for controlling the same, and a valved plunger in the upper portion of said receptacle for varying the capacity thereof, said plunger being provided with means for holding it in adjusted position.

18. In a measuring device, a receptacle having inlet and outlet ports, means for controlling the same, a plunger in the upper portion of said receptacle for varying the capacity thereof, a vent in the upper end of the receptacle and a float-valve for controlling said vent movable with said plunger.

19. In a measuring device, a receptacle having inlet and outlet ports, means for controlling the same, a tubular member adjustable within an opening in the top of said receptacle, a plunger carried by the lower end of said tubular member, a plate in said tubular member forming a partition and provided with a vent, and a valve and float secured within said tubular member, said valve serving to close said vent.

20. In a measuring device, a receptacle having inlet and outlet ports, means for controlling the same, a cap upon said receptacle having a screw-threaded opening therethrough, a threaded tubular member within said opening having a plunger at its lower end situated within said receptacle, a partition within said tubular member having a vent and a valve and float for controlling said vent.

JOHN FRITSCHE.

Witnesses:
HARRY COBB KENNEDY,
C. D. MCVAY.